(12) United States Patent
Kim et al.

(10) Patent No.: US 8,587,564 B2
(45) Date of Patent: Nov. 19, 2013

(54) TOUCH MODULE, DISPLAY DEVICE HAVING THE TOUCH MODULE, AND METHOD FOR DETECTING A TOUCH POSITION OF THE TOUCH MODULE

(75) Inventors: Jong-Hee Kim, Hwaseong-si (KR); Cheol-Woo Park, Suwon-si (KR); Jin-Hwan Kim, Suwon-si (KR); Guk-Hyun Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 693 days.

(21) Appl. No.: 12/886,527

(22) Filed: Sep. 20, 2010

(65) Prior Publication Data

US 2011/0169774 A1 Jul. 14, 2011

(30) Foreign Application Priority Data

Jan. 8, 2010 (KR) ........................ 10-2010-0001617

(51) Int. Cl.
*G06F 3/042* (2006.01)

(52) U.S. Cl.
USPC ........................................... 345/176

(58) Field of Classification Search
USPC ........ 250/227.21, 227.22; 345/170, 173, 174, 345/175, 176; 349/12, 65, 68; 359/291; 361/690, 699; 362/618; 385/37
See application file for complete search history.

(56) References Cited

U.S. PATENT DOCUMENTS

| | | | | |
|---|---|---|---|---|
| 4,480,182 A | * | 10/1984 | Ely et al. | 250/227.22 |
| 2008/0284925 A1 | * | 11/2008 | Han | 349/12 |
| 2008/0285307 A1 | | 11/2008 | Aylward et al. | |
| 2009/0021488 A1 | | 1/2009 | Kali et al. | |

FOREIGN PATENT DOCUMENTS

| | | |
|---|---|---|
| JP | 2007-042093 | 2/2007 |
| JP | 2009-503797 | 1/2009 |
| JP | 2009-525512 | 7/2009 |
| KR | 1020080060127 | 7/2008 |
| KR | 1020080101802 | 11/2008 |
| KR | 1020090051613 | 5/2009 |
| KR | 1020090060283 | 6/2009 |

* cited by examiner

*Primary Examiner* — Dwayne Bost
*Assistant Examiner* — Sepehr Azari
(74) *Attorney, Agent, or Firm* — H.C. Park & Associates, PLC

(57) ABSTRACT

The present invention relates to a touch module including a light emitting part, a light waveguide, a frustration layer, and a light receiving part. The light emitting part emits light and is disposed along a first direction. The light waveguide includes a first side surface and a second side surface and transmits light incident to the first side surface to the second side surface. The light emitting part is disposed on the first side surface, and the second side surface is disposed opposite to the first side surface along a second direction substantially perpendicular to the first direction. The frustration layer is disposed over the light waveguide and contacts the light waveguide in response to a touch to frustrate a total internal light reflection. The light receiving part is disposed on the second side surface of the light waveguide to detect a position of the touch. The frustration layer includes a plurality of frustration parts, the total internal light reflection is frustrated at a contact surface between a frustration part and the light waveguide, and an area of a first frustration part differs from an area of a second frustration part that is spaced apart from the first frustration part.

20 Claims, 6 Drawing Sheets

TOUCH MODULE, DISPLAY DEVICE HAVING THE TOUCH MODULE, AND METHOD FOR DETECTING A TOUCH POSITION OF THE TOUCH MODULE

CROSS REFERENCE TO RELATED APPLICATION

This application claims priority from and the benefit of Korean Patent Application No. 10-2010-0001617, filed on Jan. 8, 2010, which is hereby incorporated by reference for all purposes as if fully set forth herein.

BACKGROUND OF THE INVENTION

1. Field of the Invention

Exemplary embodiments of the present invention relate to a touch module, a display device having the touch module and a method for detecting a touch position of the touch module. More particularly, exemplary embodiments of the present invention relate to a touch module capable of detecting a touch position with high accuracy and speed, a display device is having the touch module, and a method for detecting a touch position of the touch module.

2. Discussion of the Background

Generally, a touch panel is a type of interface between information technology equipment using various displays and a user, and is an input apparatus capable of interfacing with the information technology equipment by direct contact with a finger of the user or a stylus pen.

The touch panel may be intuitively operated by contacting one's finger with a button displayed on the touch panel, so that the touch panel may be widely applied to cellular phones, personal digital assistants (PDAs), bank information signs, public offices, medical centers, tourist attractions, and traffic signs, etc., including a liquid crystal display (LCD) or a cathode ray tube monitor.

The touch panel may be classified as a resistive/pressure sensitive type, a capacitive/electrostatic type, or an infrared light type, for example, based on the method of operating the touch panel.

The infrared light type touch panel uses infrared light, which is invisible, but rectilinear, and which may be blocked by an obstacle. The infrared light type touch panel may include infrared light emitting diodes (LEDs) as light emitting elements and photo transistors as light receiving elements disposed opposite to the infrared LEDs. Light generated from the infrared LEDs may be blocked when a finger touches a screen, for instance. Then, a cell position at which the light is blocked is detected according to an amount of the light received by the photo transistors.

However, in the infrared light type touch panel, a touched position may be misdetected by variations of an obstacle, an applied pressure/area, or humidity. In addition, is when multi-touches are applied to the touch panel, signal processing may be more complicated, so that signal processing may be delayed and a signal processor may need more components.

SUMMARY OF THE INVENTION

Exemplary embodiments of the present invention provide a touch module capable of detecting a touch position with high accuracy and speed.

Exemplary embodiments of present invention also provide a display device having the touch module.

Exemplary embodiments of present invention also provide a method for detecting a touch position of the touch module.

Additional features of the invention will be set forth in the description which follows, and in part will be apparent from the description, or may be learned by practice of the invention.

An exemplary embodiment of the present invention discloses a touch module including a light emitting part, a light waveguide, a frustration layer, and a light receiving part. The light emitting part emits light along a first direction. The light waveguide includes a first side surface and a second side surface and transmits light incident to the first side surface to the second side surface. The light emitting part is disposed on the first side surface, and the second side surface is disposed opposite to the first side surface along a second direction substantially perpendicular to the first direction. The frustration layer is disposed over the light waveguide and contacts the light waveguide in response to a touch to frustrate a total internal light reflection. The light receiving part is disposed on the second side surface of the light waveguide and receives the light to detect a position of the touch. The frustration layer includes a plurality of frustration parts, the total internal light reflection is frustrated at a contact surface between a frustration part and the light waveguide, and an area of a first frustration part differs from an area of a second frustration part that is spaced apart from the first frustration part.

An exemplary embodiment of the present invention also discloses a display device including a light emitting part, a light waveguide, a frustration layer, a light receiving part, and a display panel. The light emitting part emits light along a first direction. The light waveguide includes a first side surface and a second side surface and transmits light incident to the first side surface to the second side surface. The light emitting part is disposed on the first side surface, and the second side surface is disposed opposite to the first side surface along a second direction substantially perpendicular to the first direction. The frustration layer is disposed over the light waveguide and contacts the light waveguide in response to a touch to frustrate a total internal light reflection. The light receiving part is disposed on the second side surface of the light waveguide and receives the light to detect a position of the touch. The display panel is disposed under the light waveguide and displays an image. The frustration layer includes a plurality of frustration parts, the total internal reflection of the light is frustrated at a contact surface between a frustration part and the light waveguide, and an area of a first frustration part differs from an area of a second frustration part that is spaced apart from the first frustration part.

An exemplary embodiment of the present invention also discloses a method for detecting a touch position of a touch module including emitting light to a first side surface of a light waveguide, contacting a plurality of frustration parts with the light waveguide to frustrate a total internal light reflection in response to a touch, and receiving the light at a second side surface to detect a position of the touch. The total internal light reflection is frustrated at a contact surface between a frustration part and the light waveguide, and an area of a first frustration part differs from an area of a second frustration part that is spaced apart from the first frustration part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, show embodiments of the invention, and together with the description serve to explain the principles of the invention.

DETAILED DESCRIPTION OF THE ILLUSTRATED EMBODIMENTS

Figure 1:
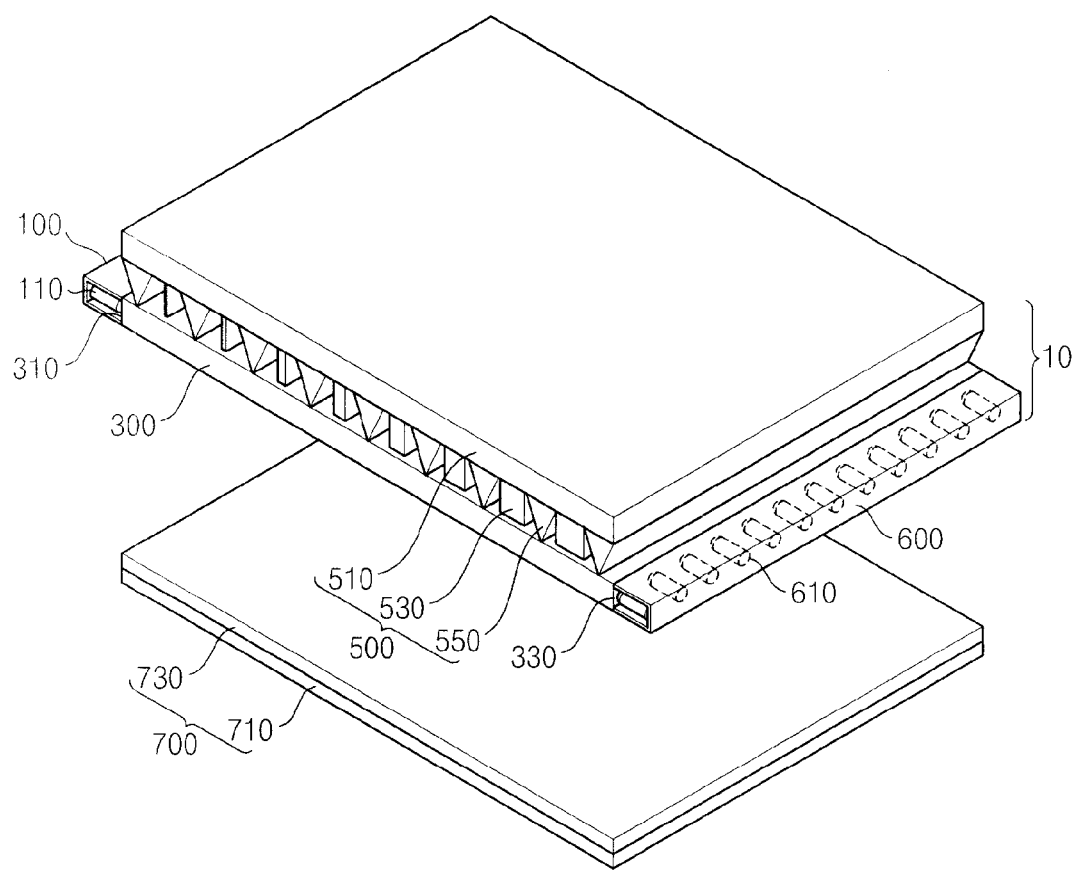
FIG. 1 is a perspective view showing a display device according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions shown herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a perspective view showing a display device according to an exemplary embodiment of the present invention.

Referring to FIG. 1, the display device 1 includes a touch module 10 and a display panel 700.

The touch module 10 is disposed over the display panel 700. The touch module 10 includes a light emitting part 100, a light waveguide 300, a frustration layer 500 and a light receiving part 600. The touch module 10 detects a touch position and provides information on the touch position to the display panel 700, when an external touch is applied to the touch module 10.

The light emitting part 100 is disposed on a first side surface 310 of the light waveguide 300 to emit light. The light waveguide 300 transmits the light incident to the first side surface 310 to a second side surface 330 opposite to the first side surface 310. For example, the light waveguide 300 may totally and internally reflect the light. The frustration layer 500 is disposed over the light waveguide 300 and includes a plurality of frustration parts 530.

The frustration part corresponding to the external touch among the frustration parts 530 contacts the light waveguide 300 to frustrate total internal light reflection. Areas of the frustration parts 530 contacts the light waveguide 300 may be different from each other according to positions of the frustration parts 530.

The light receiving part 600 is disposed on the second side surface 330 of the light waveguide 300. The light receiving part 600 receives the light passing through the light waveguide 300 and detects the touch position based on an amount of received light. The touch module 10 will be described later in detail.

The display panel 700 is disposed under the light waveguide 300 to display an image through the light waveguide 300 that may be transparent. The display panel 700 may display the image corresponding to the touch position provided from the touch module 10.

The display panel 700 includes a first substrate 710 and a second substrate 730 on the first substrate 710. For example, the display panel 700 may be a liquid crystal display panel, a field emission display panel, a plasma display panel, a light emitting display panel, and so on. Hereinafter, the display panel 700 is referred to as the liquid crystal display panel.

The first substrate 710 may include a plurality of data lines, a plurality of gate lines intersecting the data lines, a pixel region defined by the data lines and the gate lines, and a thin-film transistor electrically connected to the pixel region. Although not shown in FIG. 1, a backlight assembly providing the display panel 700 with the light may be disposed under the display panel 700.

The thin-film transistor provides the pixel region with an image signal that is provided from the data lines in response to a gate signal provided from the gate lines. A liquid crystal layer disposed between the first substrate 710 and the second substrate 730 responds to a voltage between the first substrate 710 and the second substrate 730, that is, the image signal applied to the pixel region.

The second substrate 730 may include a color filter, a common electrode, and a black matrix, for example. In addition, the color filter and the common electrode may be formed on the first substrate 710.

Figure 2:
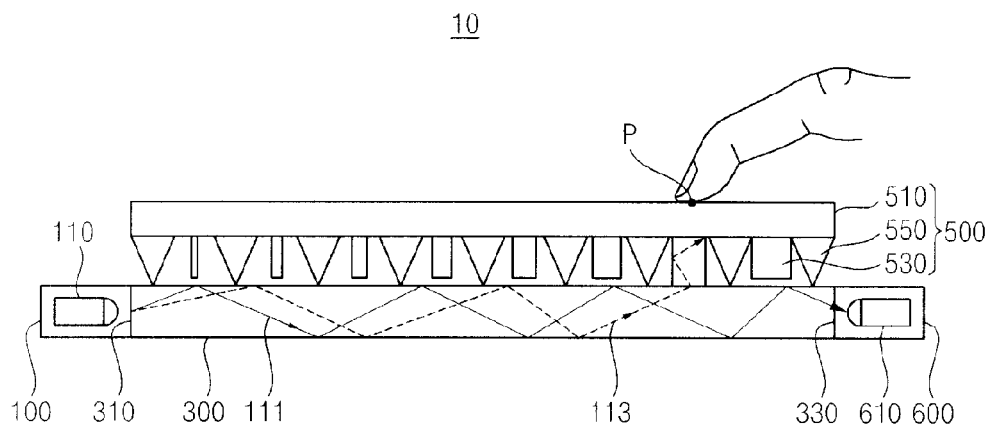
FIG. 2 is a cross-sectional view showing a touch module of FIG. 1.
Figure 3:
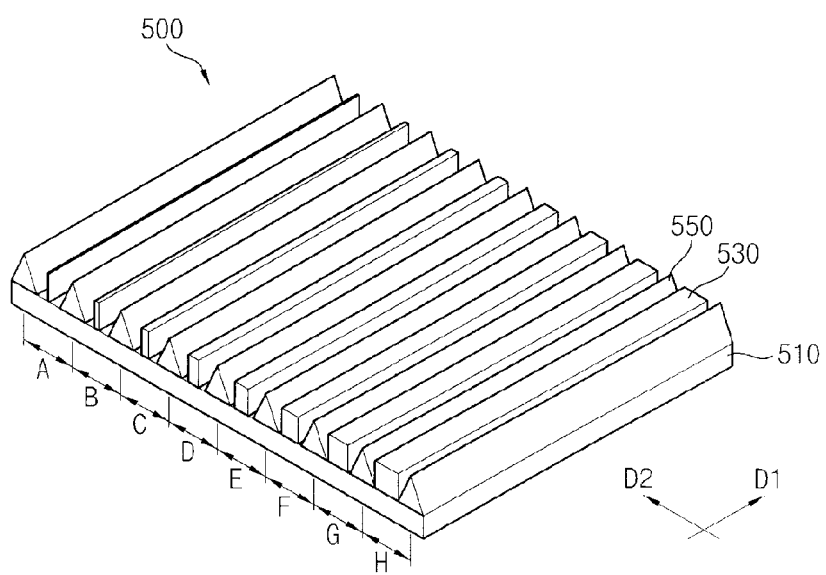
FIG. 3 is a perspective view showing a frustration layer of FIG. 2.

FIG. 2 is a cross-sectional view showing a touch module of FIG. 1. FIG. 3 is a perspective view showing a frustration layer of FIG. 2.

Referring to FIG. 2 and FIG. 3, the touch module 10 includes the light emitting part 100, the light waveguide 300, the frustration layer 500, and the light receiving part 600.

The touch module 10 uses the total internal light reflection as a frustrated total internal reflection type. The total internal reflection is an optical phenomenon that occurs when a ray of light strikes a medium boundary at an angle larger than a particular critical angle with respect to the normal to the surface. If the refractive index is smaller on the other side of the boundary, no light can pass through and all of the light is reflected. The critical angle is the angle of incidence above which the total internal reflection occurs.

The light emitting part 100 is disposed on the first side surface 310 of the light waveguide 300 to emit light. The light emitting part 100 may include a plurality of light emitting elements 110 that are disposed along a first direction D1. The light emitting elements may be infrared LEDs. The light emitted from the light emitting part 100 is incident to the first side surface 310 of the light waveguide 300.

The light waveguide 300 totally and internally reflects the light incident to the first side surface 310 in the light waveguide 300. The total internal reflection in the light waveguide 300 may be frustrated by contacting an external obstacle.

For example, the light waveguide 300 may include acrylic resin such as polymethylmethacrylate (PMMA) or tempered glass such as white glass.

The frustration layer 500 is disposed over the light waveguide 300 and includes a plurality of frustration parts 530. The frustration parts 530 contact the light waveguide 300 corresponding to the external touch to frustrate the total internal light reflection. The external touch is accomplished by a pointing device such as a finger, a stylus pen, and so on.

The frustration parts 530 are respectively formed in sensing regions A, B, C, D, E, F, G, and H. Areas of each frustration part 530 contacting the light waveguide 300 in the sensing regions A, B, C, D, E, F, G, and H may be different from each other. In this exemplary embodiment, the sensing regions are divided into eight regions A, B, C, D, E, F, G, and H, but the sensing regions may be divided as occasion demands.

The frustration layer 500 may further include a transparent substrate 510 that is formed substantially parallel with the light waveguide 300. The frustration parts 530 may protrude from the transparent substrate 510 toward the light waveguide 300 and may have a bar or rectangular shape arranged in parallel with each other.

The frustration parts 530 may extend in the first direction D1 and may be arranged in parallel in a second direction D2 substantially perpendicular to the first direction D1. The frustration parts 530 may be formed from the same materials as the transparent substrate 510. In addition, the frustration parts 530 may be integrally formed with the transparent substrate 510.

The area of each frustration part 530 contacting the light waveguide 300 may gradually increase as each frustration part 530 is arranged further away from the first side surface 310 of the light waveguide 300. Alternatively, the area of each frustration part 530 contacting the light waveguide 300 may gradually decrease as each frustration part 530 is arranged further away from the first side surface 310 of the light waveguide 300.

A light 111 that does not arrive at a contact surface between the light waveguide 300 and the frustration parts 530, is totally reflected inside of the light waveguide 300 to reach the light receiving part 600. In contrast, a light 113 that arrives at the contact surface between the light waveguide 300 and the frustration parts 530, is not totally reflected inside of the light waveguide 300 by the frustration parts 530.

The frustration parts 530 may have a refractive index substantially the same as that of the light waveguide 300. In this case, the light 113 that arrives at the contact surface between the light waveguide 300 and the frustration parts 530 is incident to the frustration parts 530. The frustration parts 530 may include a transparent material such as polydimethylsiloxane (PDMS).

The frustration layer 500 may further include at least two supporting parts 550. The supporting parts 550 protrude from the transparent substrate 510 toward the light waveguide 300 to maintain a gap between the light waveguide 300 and the frustration parts 530.

The supporting parts 550 may be formed in a border dividing the sensing regions and may be spaced apart from each other by a predetermined distance. In this exemplary embodiment, the supporting parts 550 have a trigonal prism shape, but the supporting parts 550 may vary in shape, such as a square column shape, and so on. In addition, each supporting part 550 may include substantially the same materials and may have substantially the same shape.

The light receiving part 600 is disposed on the second side surface 330 opposite to the first side surface 310 of the light waveguide 300. The light receiving part 600 receives the light passing through the light waveguide 300 and detects the touch position P based on the amount of the received light. The light receiving part 600 may include a plurality of light receiving elements 610 that are disposed along the first direction D1 to respectively correspond to the light emitting elements 110. The light receiving elements 610 may be photo transistors.

Figure 4:
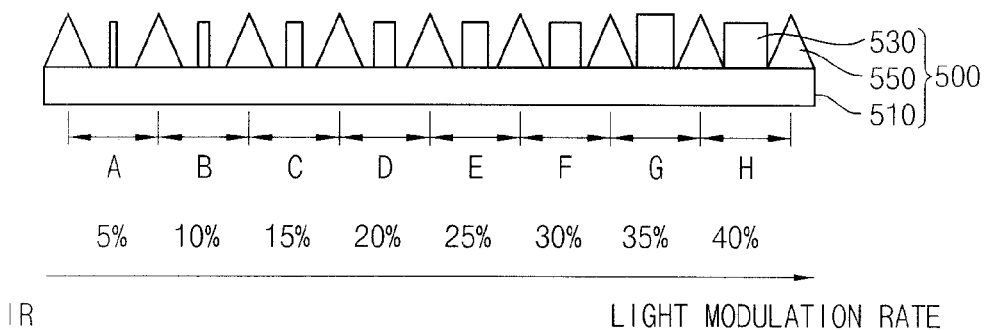
FIG. 4 is a conceptual diagram showing light modulation rate of the frustration parts of FIG. 3.

FIG. 4 is a conceptual diagram showing light modulation rate of the frustration parts 530 of FIG. 3.

Referring to FIG. 1, FIG. 2, FIG. 3, and FIG. 4, the frustration parts 530 are respectively formed in the sensing regions A, B, C, D, E, F, G, and H. The area of each frustration part 530 contacting the light waveguide 300 may gradually increase as each frustration part 530 is arranged further away from the first side surface 310 of the light waveguide 300.

As the area of each frustration part 530 contacting the light waveguide 300 increases, the total internal light reflection may be increasingly frustrated inside of the light waveguide 300. Therefore, as the area of each frustration part 530 contacting the light waveguide 300 increases, the amount of light arriving at the light receiving part 600 through the light waveguide 300 may decrease.

For example, the contact surface between the light waveguide 300 and the frustration parts 530 may be the smallest in the sensing region A. When a touch is applied in the sensing region A, a light modulation rate is about 5% so that the total internal light reflection may be frustrated relatively infrequently. Therefore, when a touch is applied in the sensing region A, an amount of light received at the light receiving part 600 may be near a maximum.

In contrast, the contact surface between the light waveguide 300 and the frustration parts 530 is the largest in the sensing region H. When a touch is applied in the sensing region H, a light modulation rate is about 40% so that the total internal light reflection may be frustrated relatively frequently. Therefore, when a touch is applied in the sensing region H, an amount of light received at the light receiving part 600 may be near a minimum.

The amount of the light received at the light receiving part 600 is simulated based on the light modulation rate in each of the sensing regions A, B, C, D, E, F, G, and H, and then the look-up table is stored in the light receiving part 600. The look-up table may include information on the amount of light received at the light receiving part 600 and the positions of the frustration parts 530 corresponding to the amount of light received at the light receiving part 600. In this case, the light receiving part 600 may efficiently detect the positions of the frustration parts 530 corresponding to the amount of received light, using the look-up table. In particular, when a number of touches is more than two (which may be referred to as "multitouches"), the touch position P may be easily detected without complicated signal processing, using the look-up table.

Table 1 below shows an example of the look-up table including information on the amount of light received at the light receiving part 600 and the positions of the frustration parts 530 corresponding to the amount of received light, when two touches are simultaneously applied on the touch module 10 in the second direction D2. The unit of the amount of received light is a percentage (%), and the amount of received light is defined as 100% when no touch is is applied.

TABLE 1

| Positions of the frustration parts contacting the light waveguide | Amount of received light (%) |
|---|---|
| AB | 85.5 |
| AC | 80.75 |
| AD | 76 |
| AE | 71.25 |
| AF | 66.5 |
| AG | 61.75 |
| AH | 57 |
| BC | 76.5 |
| BD | 72 |
| BE | 67.5 |
| BF | 63 |
| BG | 58.6 |
| BH | 54 |
| CD | 68 |
| CE | 63.75 |
| CF | 59.5 |
| CG | 55.25 |
| CH | 51 |
| DE | 60 |
| DF | 56 |
| DG | 52 |
| DH | 48 |
| EF | 52.5 |
| EG | 48.75 |
| EH | 45 |
| FG | 45.5 |
| FH | 42 |
| GH | 39 |

Referring to Table 1, the amount of light received at the light receiving part 600 varies according to the positions of the frustration parts 530 corresponding to two touches. Thus, the light receiving part 600 detects the positions of the frustration parts 530 matching the amount of received light using the look-up table, so that the touch position P may be efficiently detected.

For example, when the amount of the light received at the light receiving part 600 is about 85.5%, two touches are applied in the sensing region A and the sensing region B at the same time. In the same manner, when the amount of the light received at the light receiving part 600 is about 51%, two touches are applied in the sensing region C and the sensing region H at the same time.

In this exemplary embodiment, the cases of two external touches are described, but the number of touches may be more than three. When there are more than three touches, the light receiving part 600 may store the look-up table based on the simulation in advance, and thus the positions in which more than three touches are applied may be detected based on the look-up table.

Table 2 below shows an example of the look-up table including information on the amount of light received at the light receiving part 600 and the positions of the frustration parts 530 corresponding to the amount of received light, when seven touches are applied on the touch module 10 in the second direction D2. It is assumed that the touches are simultaneously applied regardless of an order of the touches. The unit of the amount of received light is also a percentage (%), and the amount of received light is defined as 100% when no touch is applied.

TABLE 2

| Positions of the frustration parts contacting the light waveguide | Amount of received light (%) |
| --- | --- |
| AB | 85.500002 |
| ABC | 72.675002 |
| ABCD | 58.140004 |
| ABCDE | 43.605003 |
| ABCDEF | 30.523503 |
| ABCDEFG | 19.840276 |
| ABCDEG | 28.343251 |
| ABCDEGF | 19.840276 |
| ABCDF | 40.698004 |
| ABCDFE | 30.523503 |
| ABCDFEG | 19.840276 |
| ABCDFG | 26.453704 |
| ABCDFGE | 19.840276 |
| ABCDG | 37.791002 |
| ABCDGE | 28.343251 |
| ABCDGEF | 19.840276 |
| ABCDGF | 26.453704 |
| ABCDGFE | 19.840276 |
| ABCE | 54.506254 |
| ABCED | 43.605003 |
| ABCEDF | 30.523503 |
| ABCEDFG | 19.840276 |
| ABCEDG | 28.343251 |
| ABCEDGF | 19.840276 |
| ABCEF | 38.154379 |
| ABCEFD | 30.523503 |
| ABCEFDG | 19.840276 |
| . | . |
| . | . |
| . | . |

Referring to Table 2, the amount of received light of the light receiving part 600 varies according to the touch position P and the number of the touches.

For example, when the amount of light received at the light receiving part 600 is about 19.84%, seven touches are applied in the sensing regions A, B, C, D, E, F, and G at the same time. The amount of light received at the light receiving part 600 when multi-touches are applied may vary. Thus, the touch positions P matching the amount of received light may be also easily detected using the look-up table, when the multi-touches are applied.

Figure 5:
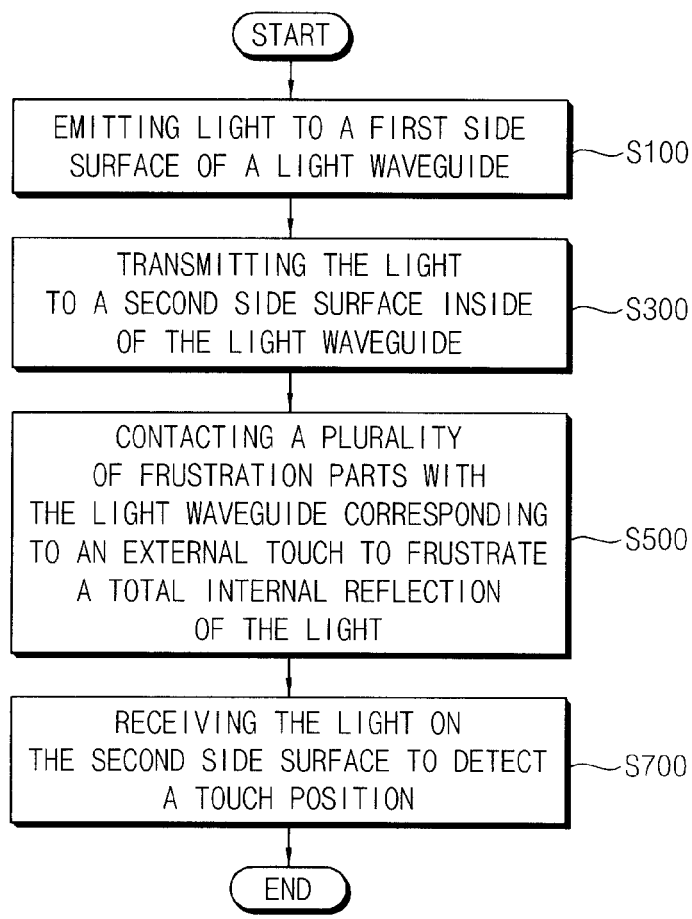
FIG. 5 is a flowchart showing a method for detecting a touch position of the touch module of FIG. 2.

FIG. 5 is a flowchart showing a method for detecting a touch position P of the touch module of FIG. 2.

Referring to FIG. 1, FIG. 2, FIG. 3, FIG. 4, and FIG. 5, in the method for detecting the touch position P of the touch module 10, the light is incident to the first side surface 310 of the light waveguide 300 (step S100). The light is emitted from the light emitting part 100 disposed on the first side surface 310 of the light waveguide 300. The light emitting part 100 may include a plurality of the light emitting elements 110 that are disposed along the first direction D1. The light emitting elements may be infrared LEDs.

The light incident to the first side surface 310 is totally and internally reflected inside of the light waveguide 300 (step S300). The total internal reflection inside of the light waveguide 300 may be frustrated when the light waveguide 300 contacts an obstacle.

The frustration parts 530 contact the light waveguide 300 corresponding to a touch to frustrate the total internal light reflection. Areas of the frustration parts 530 contacting the light waveguide 300 are different from each other according to positions (step S500). The touch is accomplished by a pointing device such as a stylus pen, a finger and so on.

For example, when the touch is applied at the touch position P, coordinates in the first direction D1 and in the second direction D2 (for example, A, B, C, D, E, F, G, and H) of the touch position P may be detected based on the amount of light received at the light receiving part 600. The coordinates in the first direction D1 of the touch position P may correspond to a position of the light receiving element 610 that has the minimum amount of received light among the light receiving elements 610. The coordinates in the second direction D2 of the touch position P may be detected using the look-up table.

The look-up table may include information on the amount of received light and the positions of the frustration parts 530 corresponding to the amount of received light. The look-up table may be stored in advance based on the simulation of the amount of light received in the sensing regions A, B, C, D, E, F, G, and H respectively corresponding to the frustration parts 530. The light receiving part 600 may confirm the amount of light received at the light receiving elements and may find the frustration parts 530 matching the amount of received light in the look-up table at the same time.

A number of touches may be one or more than one. For example, in the first direction D1, the touches may be recognized to be as many as the number of the light emitting elements 110 of the light emitting part 100 and/or as many as the number of the light receiving elements 610 of the light receiving part 600. In addition, in the second direction D2, the touches may be recognized as significant digits of an analogue to digital conversion value of the number of frustration parts 530.

Figure 6:
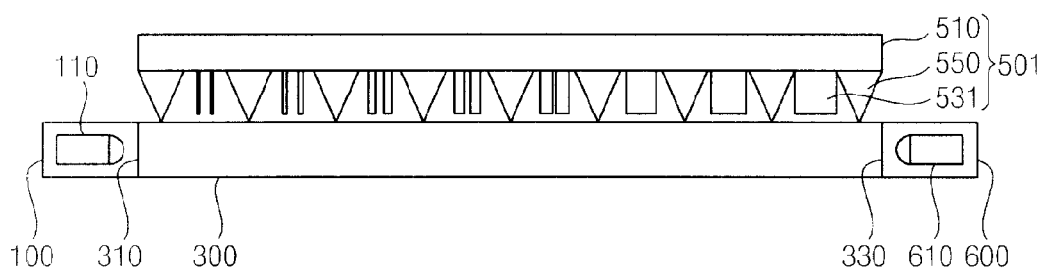
FIG. 6 is a cross-sectional view showing a touch module according to an exemplary embodiment of the present invention.
Figure 7:
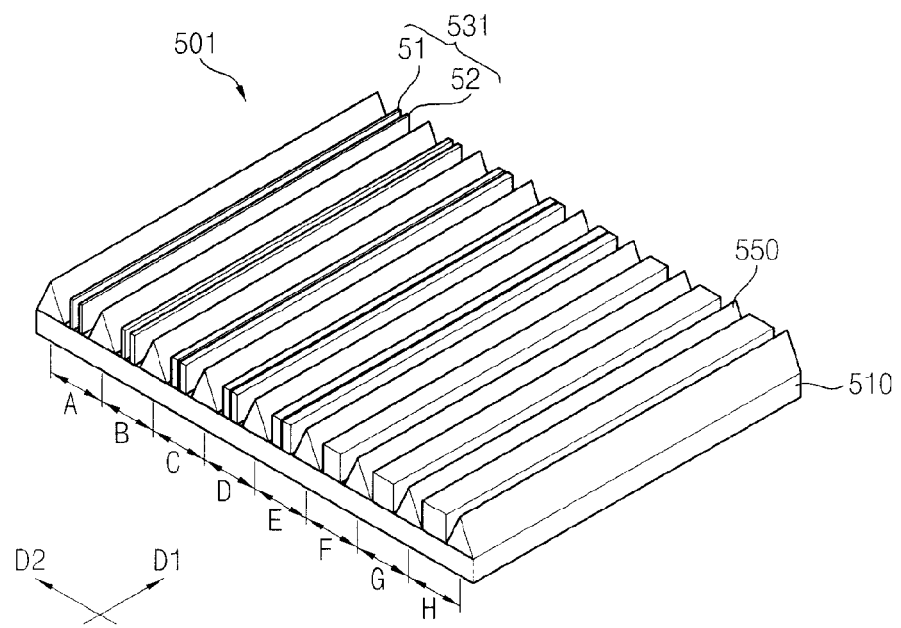
FIG. 7 is a perspective view showing a frustration layer of FIG. 6.

FIG. 6 is a cross-sectional view showing a touch module according to an exemplary embodiment of the present invention. FIG. 7 is a perspective view showing a frustration layer of FIG. 6.

Referring to FIG. 2, FIG. 3, FIG. 4, FIG. 5, FIG. 6, and FIG. 7, the touch module 11 includes a light emitting part 100, a light waveguide 300, a frustration layer 501 and a light receiving part 600. The touch module 11 according to this exemplary embodiment is substantially the same as the touch module 10 shown in FIG. 2, except for the frustration layer 501. Thus, the same reference numerals will be used to refer to the same or like parts as those described in the exemplary embodiment shown in FIG. 2, and any further repetitive explanation concerning the above elements will be omitted.

The frustration layer 501 is disposed over the light waveguide 300 and includes a plurality of frustration parts 531. The frustration parts 531 are formed in sensing regions A, B, C, D, E, F, G, and H. Areas of each frustration part 531 contacting the light waveguide 300 in the sensing regions A, B, C, D, E, F, G, and H may be different from each other. In this exemplary embodiment, the sensing regions are divided into eight regions A, B, C, D, E, F, G, and H, but the sensing regions may be divided as occasion demands.

The area of each frustration part 531 contacting the light waveguide 300 may gradually increase as each frustration part 531 is arranged further away from the first side surface 310 of the light waveguide 300. Alternatively, the area of each frustration part 531 contacting the light waveguide 300 may gradually decrease as each frustration part 531 is arranged further away from the first side surface 310 of the light waveguide 300.

At least one of the frustration parts 531 may include at least two sub frustration parts 51 and 52.

The sub frustration parts 51 and 52 formed in the same sensing region may have heights which protrude from the transparent substrate 510, and which are substantially the same as each other, and widths in the second direction D2, which are substantially the same as each other. For example, the areas of the sub frustration parts 51 and 52 formed in the same sensing region, which contact the light waveguide 300, may be substantially the same as each other. At least two sub frustration parts 51 and 52 may be formed in a single sensing region so that a touch sensitivity may be improved.

The frustration parts 531 formed in the sensing regions A, B, C, D, and E having two sub frustration parts 51 and 52 are shown in this exemplary embodiment. Alternatively, all frustration parts 531 or some of the frustration parts 531 may include more than two sub frustration parts.

A method for detecting the touch position of the touch module 11 according to this exemplary embodiment is substantially the same as the method for detecting the touch position P of the touch module 10 shown in FIG. 5, and thus any further repetitive explanation will be omitted.

Figure 8:
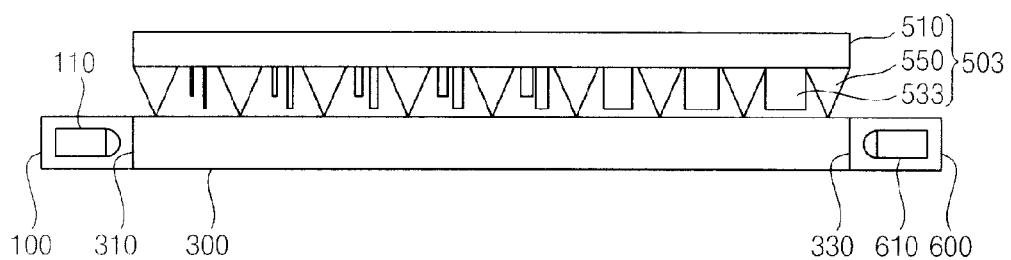
FIG. 8 is a cross-sectional view showing a touch module according to an exemplary embodiment of the present invention.
Figure 9:
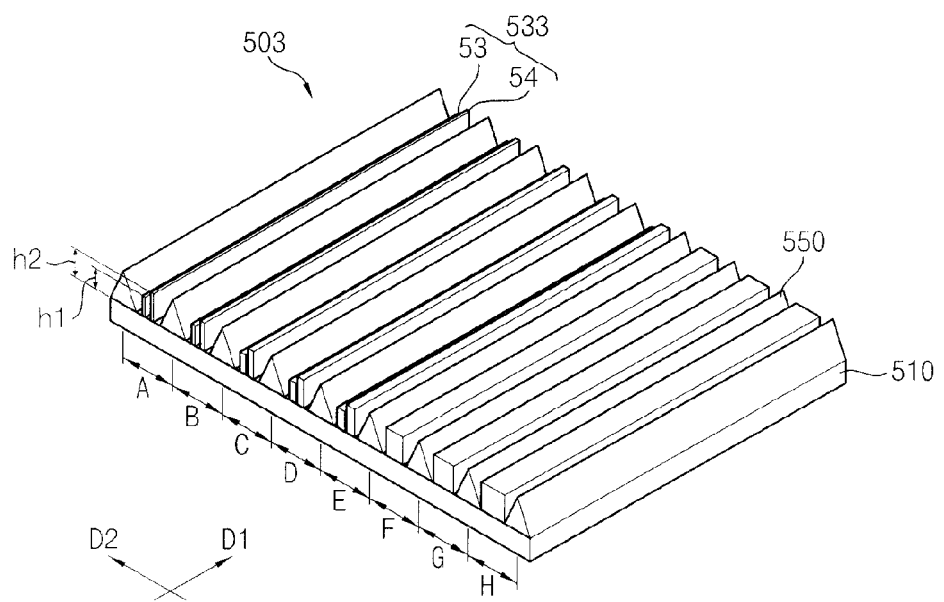
FIG. 9 is a perspective view showing a frustration layer of FIG. 8.

FIG. 8 is a cross-sectional view showing a touch module according to an exemplary embodiment of the present invention. FIG. 9 is a perspective view showing a frustration layer of FIG. 8.

Referring to FIG. 2, FIG. 3, FIG. 4, FIG. 5, FIG. 8, and FIG. 9, the touch module 13 includes a light emitting part 100, a light waveguide 300, a frustration layer 503 and a light receiving part 600. The touch module 13 according to this exemplary embodiment is substantially the same as the touch module 10 shown in FIG. 2, except for the frustration layer 503. Thus, the same reference numerals will be used to refer to the same or like parts as those described in the exemplary embodiment shown in FIG. 2, and any further repetitive explanation concerning the above elements will be omitted.

The frustration layer 503 is disposed over the light waveguide 300 and includes a plurality of frustration parts 533. The frustration parts 533 are formed in sensing regions A, B, C, D, E, F, G, and H. Areas of each frustration part 533 contacting the light waveguide 300 in the sensing regions A, B, C, D, E, F, G, and H may be different from each other. In this exemplary embodiment, the sensing regions are divided into eight regions A, B, C, D, E, F, G, and H, but the sensing regions may be divided as occasion demands.

The area of the frustration part 533 contacting the light waveguide 300 may gradually increase as each frustration part 533 is arranged further away from the first side surface 310 of the light waveguide 300. Alternatively, the area of each frustration part 533 contacting the light waveguide 300 may gradually decrease as each frustration part 533 is arranged further away from the first side surface 310 of the light waveguide 300.

At least one of the frustration parts 533 may include at least two sub frustration parts 53 and 54.

The sub frustration parts 53 and 54 formed in the same sensing region may have widths in the second direction D2, which are substantially the same as each other, and may protrude from the transparent substrate 510 and have different heights from each other. For example, a height of the first sub frustration part 53 protruding from the transparent substrate 510 may be h1, and a height of the second sub frustration part 54 protruding from the transparent substrate 510 may be h2 (h1<h2).

In this exemplary embodiment, the areas of the first and second sub frustration parts 53 and 54 contacting the light waveguide 300 may be different from each other according to an applied touch pressure. For example, when the applied touch pressure is less than a predetermined value, the second sub frustration part 54 having a height relatively higher than that of the first sub frustration part 53 may contact the light waveguide 300. When the applied touch pressure is more than the predetermined value, both the first and second sub frustration parts 53 and 54 may contact the light waveguide 300. In this case, the touch may be recognized according to the applied touch pressure as well as the touch position P.

The frustration parts 533 formed in the sensing regions A, B, C, D, and E having two sub frustration parts 53 and 54 are shown in this exemplary embodiment. Alternatively, all frustration parts 533 or some of the frustration parts 533 may include more than two sub frustration parts.

A method for detecting the touch position of the touch module 13 according to this exemplary embodiment is substantially the same as the method for detecting the touch position P of the touch module 10 shown in FIG. 5, and thus any further repetitive explanation will be omitted.

Figure 10:
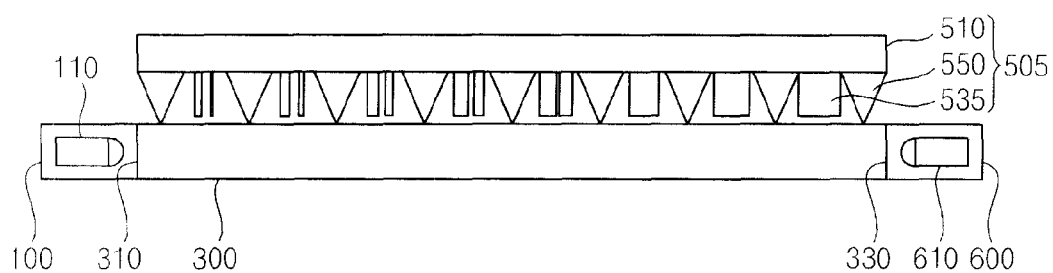
FIG. 10 is a cross-sectional view showing a touch module according to an exemplary embodiment of the present invention.
Figure 11:
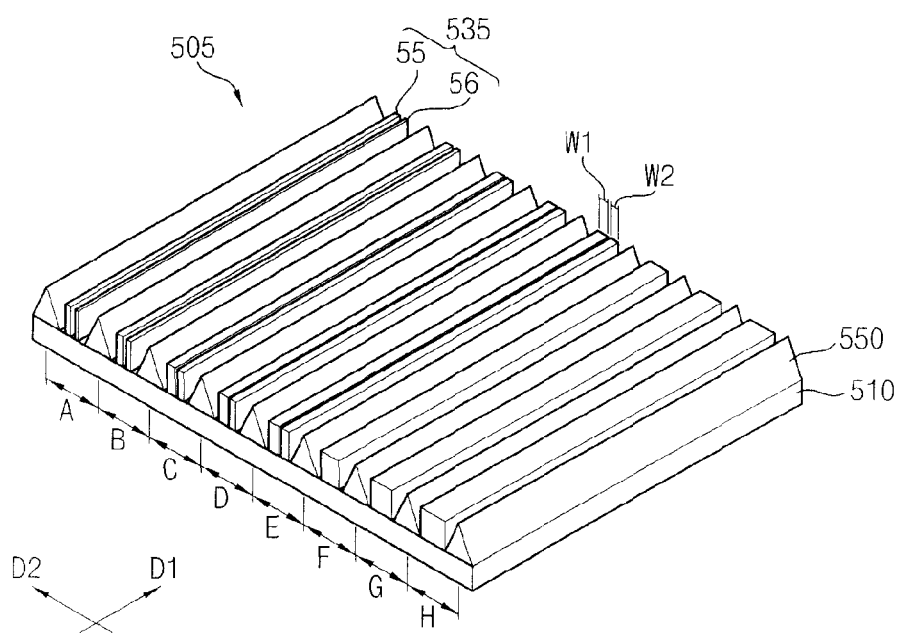
FIG. 11 is a perspective view showing a frustration layer of FIG. 10.

FIG. 10 is a cross-sectional view showing a touch module according to an exemplary embodiment of the present invention. FIG. 11 is a perspective view showing a frustration layer of FIG. 10.

Referring to FIG. 2, FIG. 3, FIG. 4, FIG. 5, FIG. 10, and FIG. 11, the touch module 15 includes a light emitting part 100, a light waveguide 300, a frustration layer 505 and a light receiving part 600. The touch module 15 according to this exemplary embodiment is substantially the same as the touch module 10 shown in FIG. 2, except for the frustration layer 505. Thus, the same reference numerals will be used to refer to the same or like parts as those described in the exemplary embodiment shown in FIG. 2 and any further repetitive explanation concerning the above elements will be omitted.

The frustration layer 505 is disposed over the light waveguide 300 and includes a plurality of frustration parts 535. The frustration parts 535 are formed in sensing regions A, B, C, D, E, F, G, and H. Areas of each frustration part 535 contacting the light waveguide 300 in the sensing regions A, B, C, D, E, F, G, and H may be different from each other. In this exemplary embodiment, the sensing regions are divided into eight regions A, B, C, D, E, F, G, and H, but the sensing regions may be divided as occasion demands.

The area of each frustration part 535 contacting the light waveguide 300 may gradually increase as each frustration part 535 is arranged further away from the first side surface 310 of the light waveguide 300. Alternatively, the area of each frustration part 535 contacting the light waveguide 300 may gradually decrease as each frustration part 535 is arranged further away from the first side surface 310 of the light waveguide 300.

At least one of the frustration parts 535 may include at least two sub frustration parts 55 and 56.

The sub frustration parts 55 and 56 formed in the same sensing region may protrude from the transparent substrate 510 and have substantially the same height as each other, and may have widths in the second direction D2 which are different from each other.

For example, a width of the first sub frustration part 55 in the second direction D2 may be W1, and a width of the second sub frustration part 56 may be W2 (W1>W2). Thus, areas of the first and second sub frustration parts 55 and 56 formed in the same sensing region, which contact the light waveguide 300, may be different from each other. In this case, the areas of the first and second sub frustration parts 55 and 56 contacting the light waveguide 300 may vary, so that the amount of received light when multi-touches are applied may vary.

The frustration parts 535 formed in the sensing regions A, B, C, D, and E having two sub frustration parts 55 and 56 are shown in this exemplary embodiment. Alternatively, all frustration parts 535 or some of the frustration parts 535 may include more than two sub frustration parts.

A method for detecting the touch position of the touch module 15 according to this exemplary embodiment is substantially the same as the method for detecting the touch position P of the touch module 10 shown in FIG. 5, and thus any further repetitive explanation will be omitted.

According to the exemplary embodiments of the present invention, the touch module includes the frustration layer, and the light modulation rate between the light emitting elements and the light receiving elements is regularly changed according to the touch position regardless of forms and intensity of the touch, so that the touch position may be accurately detected.

In addition, the touch positions corresponding to the amount of the received light may be quickly detected using the look-up table without complicated signal processing, even when multi-touches are applied on the touch module. Therefore, time and load for signal processing may be decreased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch module, comprising:
   a light emitting part to emit light along a first direction;
   a light waveguide comprising a first side surface and a second side surface, the light waveguide to transmit light incident from the first side surface to the second side surface, the light emitting part being disposed on the first side surface, and the second side surface being disposed opposite to the first side surface along a second direction substantially perpendicular to the first direction;
   a frustration layer disposed on the light waveguide, the frustration layer to contact the light waveguide in response to a touch and to frustrate a total internal light reflection; and
   a light receiving part disposed on the second side surface of the light waveguide, the light receiving part to receive light to detect a position of the touch,
   wherein the frustration layer comprises a plurality of frustration parts, the total internal light reflection to be frustrated at a contact surface between a frustration part and the light waveguide, and an area of a first frustration part differs from an area of a second frustration part that is spaced apart from the first frustration part.

2. The touch module of claim 1, wherein a refractive index of the frustration parts is substantially the same as that of the light waveguide.

3. The touch module of claim 1, wherein the frustration layer further comprises a transparent substrate disposed substantially parallel with the light waveguide, and the frustration parts protrude from the transparent substrate toward the light waveguide and have a bar shape arranged in parallel with each other.

4. The touch module of claim 3, wherein the transparent substrate is integrally formed with the frustration parts.

5. The touch module of claim 3, wherein the frustration layer further comprises at least two supporting parts that protrude from the transparent substrate to maintain a gap between the light waveguide and the frustration parts.

6. The touch module of claim 5, wherein at least two of the supporting parts are spaced apart from each other, and at least one frustration part is formed between the at least two supporting parts.

7. The touch module of claim 3, wherein the frustration parts extend in the first direction and are arranged in parallel in the second direction.

8. The touch module of claim 7, wherein the first frustration part is disposed between the first side surface of the light waveguide and the second frustration part, and the area of the first frustration part is greater than the area of the second frustration part.

9. The touch module of claim 7, wherein the first frustration part is disposed between the first side surface of the light waveguide and the second frustration part, and the area of the first frustration part is less than the area of the second frustration part.

10. The touch module of claim 7, wherein at least one of the frustration parts comprises at least two sub frustration parts.

11. The touch module of claim 10, wherein at least two sub frustration parts protrude from the transparent substrate, have heights that are substantially the same as each other, and have widths in the second direction that are substantially the same as each other.

12. The touch module of claim 10, wherein the at least two sub frustration parts have widths that are different from each other.

13. The touch module of claim 10, wherein the at least two sub frustration parts protrude from the transparent substrate and have heights that are different from each other.

14. The touch module of claim 1, wherein the light receiving part uses a look-up table to detect the touch position, and the look-up table stores information on an amount of received light and the positions of the frustration parts corresponding to the amount of received light.

15. The touch module of claim 14, wherein the information stored by the look-up table comprises the amount of received light according to a combination of at least two touch positions.

16. A display device, comprising:
    a light emitting part to emit light along a first direction;
    a light waveguide comprising a first side surface and a second side surface, the light waveguide to transmit light incident from the first side surface to the second side surface, the light emitting part being disposed on the first side surface, and the second side surface being disposed opposite to the first side surface along a second direction substantially perpendicular to the first direction;
    a frustration layer disposed on the light waveguide, the frustration layer to contact the light waveguide in response to a touch and to frustrate a total internal light reflection;
    a light receiving part disposed on the second side surface of the light waveguide, the light receiving part to receive the light to detect a position of the touch; and
    a display panel disposed under the light waveguide, the display panel to display an image,
    wherein the frustration layer comprises a plurality of frustration parts, the total internal light reflection to be frustrated at a contact surface between a frustration part and the light waveguide, and an area of a first frustration part differs from an area of a second frustration part that is spaced apart from the first frustration part.

17. The display device of claim 16, wherein the light receiving part uses a look-up table to detect the touch position, and the look-up table stores information on an amount of received light and the positions of the frustration parts corresponding to the amount of received light, and the information stored by the look-up table comprises the amount of received light according to a combination of at least two touch positions.

18. A method for detecting a touch position of a touch module, the method comprising:

emitting a light to a first side surface of a light waveguide;

contacting a plurality of frustration parts with the light waveguide to frustrate a total internal light reflection in response to a touch; and receiving the light at a second side surface to detect a position of the touch, wherein the total internal light reflection is frustrated at a contact surface between a frustration part and the light waveguide, and an area of a first frustration part differs from an area of a second frustration part that is spaced apart from the first frustration part.

19. The method of claim 18, wherein receiving the light on the second side surface comprises:

using a look-up table to detect the touch position, the look-up table storing information on an amount of received light and the positions of the frustration parts corresponding to the amount of received light.

20. The method of claim 19, wherein the information stored by the look-up table comprises the amount of received light according to a combination of at least two touch positions.

* * * * *